UNITED STATES PATENT OFFICE.

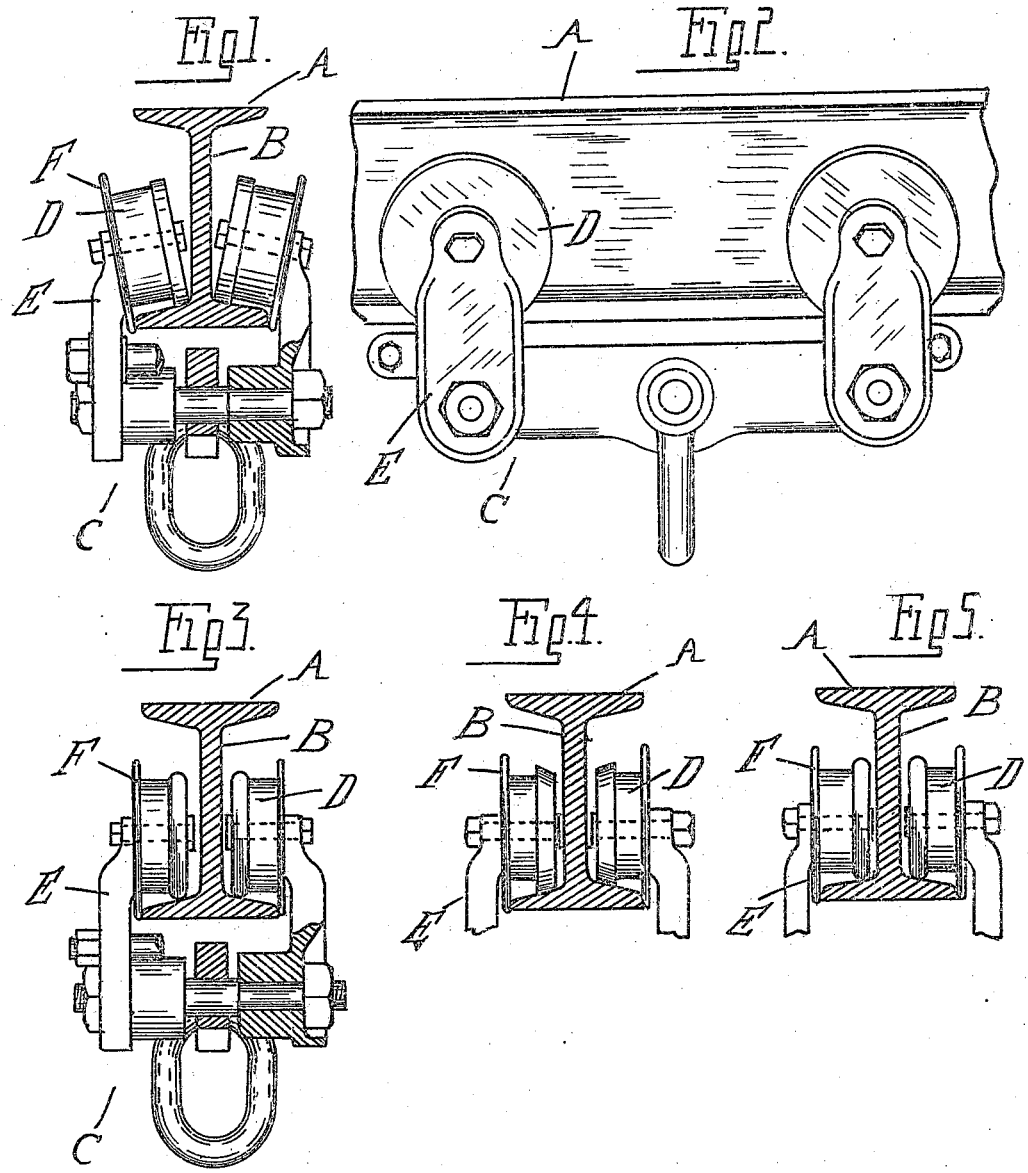

GEORGE A. TRUE, OF DETROIT, MICHIGAN, ASSIGNOR OF ONE-HALF TO NORTHERN ENGINEERING WORKS, OF DETROIT, MICHIGAN, A CORPORATION OF MICHIGAN.

TROLLEY.

953,448.  Specification of Letters Patent.  Patented Mar. 29, 1910.

Application filed August 11, 1909. Serial No. 512,356.

*To all whom it may concern:*

Be it known that I, GEORGE A. TRUE, a citizen of the United States of America, residing at Detroit, in the county of Wayne and State of Michigan, have invented certain new and useful Improvements in Trolleys, of which the following is a specification, reference being had therein to the accompanying drawings.

The invention relates to a construction of trolley wherein the elevated track is formed by a beam carrying a laterally projecting flange constituting the track proper, and it consists in a construction wherein the trolley wheel travels upon a portion only of the track flange, and this in immediate proximity to the beam body, whereby the strains that are imposed by the load are transmitted directly to the body and the bending of the track flange prevented.

The invention further consists in the peculiar arrangement and combination of the several parts forming the trolley, and in certain details of construction as will be more fully hereinafter set forth.

In the drawings,—Figure 1 is an end view of a trolley construction embodying my invention, partly in section; Fig. 2 is a side elevation; Fig. 3 is a view similar to Fig. 1, illustrating a modification; and Figs. 4 and 5 are detached views of trolley wheels, showing different forms of tread surfaces.

In the drawings thus briefly described, A represents the elevated track, which may be supported in any suitable manner, and in this instance is in the form of an I-beam, the web B constituting the body of the beam and the lower flange the track proper upon which the trolley wheels are adapted to travel.

C designates a suitable frame upon which the trolley wheels are mounted, and as it constitutes no part of the present invention a description of its detail construction will be omitted.

D designates the trolley wheels, the trolley construction illustrated being preferably one in which the wheels engage upon opposite sides of the track, and these wheels are journaled in hangers E constituting part of the depending frame. The wheels are so mounted upon the frame as to have a relatively narrow bearing upon the track flange and to engage the latter during their travel only upon a relatively narrow section in immediate proximity to the web or body. By this method of construction, the marginal portions of the lower flange are free from the weight of the load, and the tendency to bend the flange resulting by the contact of the wheels, as in the ordinary construction, with the flange throughout its entire length, is obviated.

In the preferred construction of trolley, I employ trolley wheels having relative narrow tread sections formed by the raised annular bead F, these raised treads being adapted to contact with the flange in close proximity to the body, as above pointed out.

In some instances the wheels may be mounted upon the frame so as to extend in angular relation to the track, as indicated in Fig. 1. The construction, however, may be as shown in Fig. 3, wherein the wheels are parallel with each other and with the web of the beam; also, the raised tread may be frusto-conical, as shown in Fig. 4, so as to fit the incline of the bottom flange of the I-beam; or the rib may be substantially half-round in cross section, as shown in Fig. 5.

What I claim as my invention is,—

1. In a trolley, the combination with an elevated track formed with a body portion and a flange projecting laterally therefrom constituting the track proper, of a depending frame, and a roller upon the frame adapted to travel upon a relatively narrow section only of the track flange in proximity to the body.

2. In a trolley, the combination with an elevated track beam having a flange projecting laterally from opposite sides of its body portion, of a pair of trolley wheels arranged one upon each side of the body and having their track-engaging portions of considerably less width than the flange projections, and a connection between the trolley wheels compelling their travel upon the beam flange in immediate proximity to the body.

3. In a trolley, the combination with a track beam having a vertically projecting body portion and flange sections projecting laterally from opposite sides thereof, of trolley wheels arranged for travel one upon each flange section, the wheels having treads of considerably less width than the flange sections they engage, and a connection between the wheels compelling their travel upon said flange sections in immediate proximity to the beam body.

4. In a trolley, the combination with an elevated track in the form of an I-beam, of a pair of trolley wheels arranged for travel upon the lower flange of the beam on opposite sides of the web, a raised annular bead upon each wheel of less width than the section of beam flange upon which the wheel travels, and a connection between the beams compelling their treads to bear upon the beam flange in immediate proximity to the web.

In testimony whereof I affix my signature in presence of two witnesses.

GEORGE A. TRUE.

Witnesses:
 HENRY U. STAUDART,
 LOUIS H. OLFS.